US012064058B2

(12) United States Patent
Dercar et al.

(10) Patent No.: US 12,064,058 B2
(45) Date of Patent: Aug. 20, 2024

(54) CONTROLLED HEAT MANAGEMENT FOR FOOD PROCESSOR

(71) Applicant: SOCIETE DES PRODUITS NESTLE S.A., Vevey (CH)

(72) Inventors: Heinz Dercar, Vienna (AT); Bertrand Guyon, Pontarlier (FR); Johan Nieuwendijk, Vienna (AT); Wolfgang Tuider, Oberwart (AT)

(73) Assignee: Societe des Produits Nestle S.A., Vevey (CH)

( * ) Notice: Subject to any disclaimer, the term of this patent is extended or adjusted under 35 U.S.C. 154(b) by 134 days.

(21) Appl. No.: 16/766,120

(22) PCT Filed: Nov. 21, 2018

(86) PCT No.: PCT/EP2018/082001
§ 371 (c)(1),
(2) Date: May 21, 2020

(87) PCT Pub. No.: WO2019/101764
PCT Pub. Date: May 31, 2019

(65) Prior Publication Data
US 2020/0359841 A1    Nov. 19, 2020

(30) Foreign Application Priority Data

Nov. 23, 2017   (EP) .................................... 17203205

(51) Int. Cl.
*A47J 27/00*       (2006.01)
*A47J 43/046*     (2006.01)
(Continued)

(52) U.S. Cl.
CPC ......... *A47J 43/0465* (2013.01); *A47J 27/004* (2013.01); *A47J 43/0716* (2013.01); *A47J 43/08* (2013.01)

(58) Field of Classification Search
CPC .... A47J 43/0465; A47J 43/0716; A47J 43/08; A47J 27/004
(Continued)

(56) References Cited

U.S. PATENT DOCUMENTS 1,227,935 A  *  5/1917  Robertson .............. A47J 43/044
                                                                     99/348
2,867,420 A  *  1/1959  Potts ...................... A47J 43/046
                                                                     366/314
(Continued)

FOREIGN PATENT DOCUMENTS

CN         202941964 U      5/2013
CN         205286123 U      6/2016
(Continued)

OTHER PUBLICATIONS

Japanese Office Action for Appl No. 2020-527866 dated May 9, 2023.
(Continued)

*Primary Examiner* — David L Sorkin
(74) *Attorney, Agent, or Firm* — K&L Gates LLP

(57) ABSTRACT

A machine (1) for processing a liquid food substance (10) includes: a container (2) delimiting a food cavity (2') for containing said liquid food substance (10); an impeller (20) for driving the food substance (10) in the food cavity (2'); a housing (3) delimiting a powered cavity (3') that is adjacent the container (2). The powered cavity (3') contains: a motor (30) for driving the impeller (20); a heat evacuation system (35, 36, 37, 37', 37") for evacuating heat from the powered cavity (3') to a space (6) outside such machine (1), comprising a motorized ventilation arrangement (35,36); and a control unit (31). The motorized ventilation arrangement has a first ventilation device (35) driven by the impeller motor (30). Further to the first ventilation device (35) and to the impeller motor (30), the motorized ventilation arrangement (Continued)

comprises a second ventilation device (36) and a further motor (38) that is different to the impeller motor (30), the further motor (38) being controlled by the control unit (31) to drive the second ventilation device (36).

24 Claims, 4 Drawing Sheets

(51) Int. Cl.
*A47J 43/07* (2006.01)
*A47J 43/08* (2006.01)

(58) Field of Classification Search
USPC .................. 366/145–147, 205, 206, 314
See application file for complete search history.

(56) References Cited

U.S. PATENT DOCUMENTS

| | | | | |
|---|---|---|---|---|
| 6,499,873 | B1* | 12/2002 | Chen | A47J 43/085 |
| | | | | 241/282.2 |
| 6,595,113 | B1* | 7/2003 | Chang | A47J 43/0716 |
| | | | | 366/205 |
| 2001/0002891 | A1* | 6/2001 | Frankel | A47J 43/0722 |
| | | | | 426/570 |
| 2006/0044935 | A1* | 3/2006 | Benelli | A47J 27/004 |
| | | | | 366/145 |
| 2012/0167781 | A1* | 7/2012 | Lane | A47J 27/56 |
| | | | | 99/453 |
| 2017/0296992 | A1 | 10/2017 | Kolar et al. | |
| 2018/0126339 | A1* | 5/2018 | Abdo | B01F 23/2351 |

FOREIGN PATENT DOCUMENTS

| | | |
|---|---|---|
| EP | 1647217 | 4/2006 |
| EP | 3064109 | 9/2016 |
| JP | 2021503993 A | 2/2021 |
| WO | 2016202818 | 12/2016 |

OTHER PUBLICATIONS

Japanese Office Action for Appl No. 2020-527866 dated Nov. 17, 2023.

* cited by examiner

CONTROLLED HEAT MANAGEMENT FOR FOOD PROCESSOR

CROSS REFERENCE TO RELATED APPLICATIONS

The present application is a National Stage of International Application No. PCT/EP2018/082001, filed on Nov. 21, 2018, which claims priority to European Patent Application No. 17203205.4, filed on Nov. 23, 2017, the entire contents of which are being incorporated herein by reference.

FIELD OF THE INVENTION

The field of the invention pertains to machines for heating a food substance, such as milk or a milk-containing substance. For instance, the machine is provided with an impeller and a thermal management arrangement.

BACKGROUND ART

Speciality beverages in which at least a portion is made up of frothed or heated milk are becoming more and more popular. The best-known beverage of this type is a coffee of the cappuccino type. It comprises a liquid portion consisting of coffee topped by a layer of frothed milk which, because of its very much lower density, floats atop the surface of the liquid. In general, preparing one takes time, manipulation operations and cleaning.

The most customary way of preparing a milk-based froth is to pour the desired amount of milk into the container, immerse a steam outlet pipe from a coffee machine in the container, agitating it up and down to introduce the air needed to form the froth.

There also exists mechanical stirring appliances which are usually intended for domestic use for beating froth from more or less viscous food products such as eggs, ice, juices or the like. These appliances are usually ill-suited to froth the microbiologically sensitive liquids such as milk. Regular cleaning of the tank of the appliance needs to be envisaged in order to remove any solid food residue. In addition, heating the milk has a tendency to increase the extent to which cooked or burnt proteins are deposited on and adhere to the surfaces. The existing appliances are not, for the most part, well suited to reducing the encrustation of this solid residue, making cleaning troublesome. These appliances also have a stirring and drive mechanism which is fixed and intrudes into the tank, and this presents several disadvantages: the removal/refitting time is not insignificant, they have a tendency to become soiled more quickly, they entail additional cost as a result of the multiplicity of components, and the stirring means are difficult to clean.

U.S. Pat. No. 6,318,247 relates to an appliance for preparing hot beverages or food with stirring such as hot chocolate, for example. Other devices for stirring food products are described in patent documents WO 2004/043213 or DE 196 24 648. Stirring systems with a magnetic engagement type are described in documents U.S. Pat. No. 2,932,493, DE 1 131 372, U.S. Pat. Nos. 4,537,332 and 6,712,497. DE 89 15 094 relates to a refrigerated pot for dispensing a milk-based beverage. U.S. Pat. No. 3,356,349 discloses a stirring device that has a heated tank, magnetic drive means positioned under the tank for driving a hub located in the middle of the tank.

An improved appliance for preparing froth from a milk-based liquid or milk has been proposed in WO 2006/050900, WO 2008/142154, WO 2011/039222 and WO 2011/039224. The device has: an inner tank for receiving the liquid that is to be frothed, in which a rotatable stirrer is positioned; an outer stand holding the tank; drive and control means which are in a cavity located between the inner tank and the outer stand, and which communicate with a switch and electrical connections located on the outer surface of the stand; and disturbance means to optimise circulation of the milk during frothing. In WO 2010/023313 a steam source is associated with the stirring effect.

More recently, it has been proposed, as described in WO 2009/074555 and WO 2011/144647, to provide a coffee machine with this type of milk conditioning tank.

An architecture to favour the evacuation of unwanted heat generated by the operation of electric components of the milk frothing appliance has been disclosed in WO 2016/202818. As disclosed in EP2016203740, such appliance can also be fitted with fan cooler.

There is still a need to improve the management and evacuation of undesired heat from the milk frothing appliance.

SUMMARY OF THE INVENTION

It is a preferred object of the present invention to provide a machine for conditioning a food substance which provides a more reliable heat management configuration.

The invention thus relates to a machine for processing a liquid food substance, such as milk or a milk-based substance. The liquid food substance can be aqueous, e.g. containing coffee and/or chocolate and/or cacao.

The machine may be a standalone machine, e.g. directly pluggable to the mains via an electric cord, or may be integrated in a food processor arranged to process other food items or to carry out different food conditioning processes, the food processor itself being generally pluggable to the mains via an electric cord whereas the machine is a sub-part of the food processor. Such a food processor may be a beverage maker, such as a coffee maker, e.g. a beverage maker configured to prepare a beverage (such as coffee) from an ingredient capsule.

The machine of the invention may advantageously be configured to froth and/or heat and/or cool milk and optionally be associated, as a standalone machine or as an integrated machine, into a coffee maker. Standalone and integrated associations of milk frothing machines and coffee makers are for example disclosed in WO 2006/050900, WO 2008/142154, WO 2009/074555, WO 2010/023312 and WO 2010/023313.

Hence, the machine can be a milk frother which operates by incorporating finely divided gas bubbles, e.g. air bubbles, into milk. When the machine is configured for incorporating gas bubbles into the milk, it may include an operating mode without incorporation of gas bubbles.

The machine of the invention includes: a container delimiting a food cavity for containing the liquid food substance, such as a container provided with a removable lid for covering the cavity; and an impeller for driving the liquid food substance in the food cavity.

The container may have a lid to cover the cavity, e.g. as taught in WO 2008/142154.

The impeller may have a spring-like structure of the type disclosed in WO 2006/050900 or in WO 2008/142154 and/or the impeller can have a wavy and/or open disc-shaped structure as taught in WO 2016/202817.

The impeller can have a foot for being coupled to the motor, e.g. via magnetic elements in the foot.

The container can be generally cup-shaped or bowl-shaped or cylinder-shaped, the sidewall being generally upright and the bottom wall being generally flat or curved.

The container can be provided with a thermally insulating outside material and/or with a handle, for seizure and optional displacement of the container by a human hand. Such a configuration is particularly advantageous when the food is processed at a higher temperature exceeding e.g. 50° C. or below 10° C.

The machine has a housing delimiting a powered cavity, e.g. a cavity powered by the mains via an electric cord, that is adjacent the container. The housing may include a thermal conditioner for generating heat in the food cavity (heating the cavity) and/or for removing heat from the food cavity (cooling the cavity).

The housing contains: a motor for driving the impeller; and a heat evacuation system for evacuating heat from the powered cavity to a space outside such machine, comprising a motorized ventilation arrangement and at least one flow path extending in the powered cavity from at least one air inlet opening in the housing to at least one air outlet opening in the housing. For instance, the openings are located on a machine external bottom face and/or machine external side face(s).

Such openings or other parts of the housing can be formed as a radiator or a heat sink to contribute to the evacuation of heat from the chamber.

By providing a preferential heat evacuation path to minimise a transfer of undesired and/or uncontrolled heat into the container, the temperature in the container originates mainly from the thermal conditioner (if any) and can be not at all or not significantly influenced by the undesired heat generated within the powered cavity, e.g. generated by the motor and/or other electrical devices. Indeed such undesired heat is predominantly evacuated by the heat evacuation means to outside the machine without passing via the container.

The housing also contains a control unit, e.g. a unit in the powered cavity and/or fixed to the housing, for controlling the impeller motor, the motorized ventilation arrangement and, when present, the thermal conditioner.

For example, the control unit is configured to control the thermal conditioner (when present) for: carrying out different thermal profiles over time and/or for carrying out one or more thermal profiles of constant or variable heating and/or cooling; and/or disabling the thermal conditioner.

The motorized ventilation arrangement has a first ventilation device driven by the impeller motor.

Thus, the same motor drives on the one hand the machine's impeller and on the other hand the first ventilation device. Hence, the action of the heat evacuation means can be easily arranged to follow generally an increase or decrease of the action of the motor and thus an increase or decrease of power consumed by the motor. A suitable implementation of such a first ventilation device is disclosed in EP2016203740.2.

The housing may have a further arrangement for evacuating heat, e.g. as disclosed in WO 2016/202818. For example, the heat evacuation means includes a radiator, a dissipator, e.g. a ventilator, and/or a heat sink.

The container may be removable from the housing for dispensing the liquid food substance from the cavity and assemblable to the housing for processing the liquid food substance in the cavity. For instance, the housing forms a seat, e.g. generally a nest, for removably receiving the container. For example, the housing has an outer peripheral upright face that extends flush with an outer peripheral upright face of the container.

The impeller may have at least one of: a surface for imparting a mechanical effect to the liquid food substance in the container cavity, such as for mixing the liquid food substance with another fluid, e.g. air; a foot for being connected to the impeller motor, e.g. via magnetic elements in the foot; an axle extending towards a mouth of the container when the impeller is driven by the impeller motor, e.g. an axle that is seizable by a user for removing the impeller from the container.

Suitable impellers and their implementation into the machine are disclosed in WO 2016/202814, WO 2016/202815, WO 2016/202816 and WO 2016/202817 as well as EP 2016203727.9 and EP 2016203749.3.

The motor may drive a drive member which in turn drives by magnetic coupling the impeller. The drive member can incorporate one or more magnetic elements cooperating with magnetic elements of the impeller so as to drive the impeller magnetically via a wall, such as a bottom wall and/or a sidewall, of the container. For instance, the magnetic members driving the impeller via a wall of the chamber, such as a platform wall and/or a sidewall.

At least one magnetic element of the drive member may be a magnetic field-generating element that is arranged to be magnetically coupled to a corresponding ferromagnetic element of the impeller.

At least one magnetic element of the drive member may be a ferromagnetic element that is arranged to be magnetically coupled to a corresponding magnetic field-generating element of the impeller.

At least one magnetic element of the drive member can be a magnetic field-generating element that is arranged to be magnetically coupled to a corresponding magnetic field-generating element of the impeller.

Such magnetic field-generating element(s) may include an electromagnet element or a permanent magnet element, e.g. made of at least one of iron, nickel, cobalt, rare earth metals, e.g. lanthanide, and alloys and oxides containing such metals as well as polymers (e.g. plastics) carrying such elements and components.

Such ferromagnetic element(s) can be made of at least one of Co, Fe, $Fe_2O_3$, $FeOFe_2O_3$, $NiOFe_2O_3$, $CuOFe_2O_3$, $MgOFe_2O_3$, $Nd_2Fe_{14}B$, Mn, Bi, Ni, MnSb, $MnOFe_2O_3$, $Y_3Fe_5O_{12}$, $CrO_2$, MnAs, Gd, Dy, EuO, $Cu_2MnAl$, $Cu_2MnIn$, $Cu_2MnSn$, $Ni_2MnAl$, $Ni_2MnIn$, $Ni_2MnSn$, $Ni_2MnSb$, $Ni_2MnGa$, $Co_2MnAl$, $Co_2MnSi$, $Co_2MnGa$, $Co_2MnGe$, $SmCo_5$, $Sm_2Co_{17}$, $Pd_2MnAl$, $Pd_2MnIn$, $Pd_2MnSn$, $Pd_2MnSb$, $Co_2FeSi$, $Fe_3Si$, $Fe_2VAl$, $Mn_2VGa$ and $Co_2FeGe$.

The magnetic coupling of the impeller, e.g. of a low inertia impeller, can be achieved as taught in WO 2006/050900 or in WO 2008/142154.

The magnetic coupling of the impeller, e.g. of a high inertia impeller, may be achieved as taught in WO 2016/202814 or EP2016203749.3.

When a high transmission torque is transmitted to the impeller via a magnetic coupling (i.e. a strong coupling), a magnetic uncoupling arrangement may be provided, e.g. as taught in WO 2016/202815.

To facilitate the movement of the impeller, if and when in contact with a container support surface, e.g. a bottom of the container, an arrangement as taught in WO 2016/202816 may be implemented.

Alternatively, the impeller may be driven by the motor via a mechanical transmission extending from the powered cavity into the food cavity, such as a mechanical transmission extending from the motor to the impeller for an uninterrupted mechanical transmission between the motor and the impeller.

Further to the first ventilation device and to the impeller motor, the motorized ventilation arrangement comprises a second ventilation device and a further motor that is different to the impeller motor, the further motor being controlled by the control unit to drive the second ventilation device.

Hence, the second ventilation device may be used to regulate the heat evacuation via the inlet and outlet openings that is generated by the action of the first ventilation device driven by the impeller motor. The second ventilation device and the further motor may be configured to increase and/or reduce the effect of the first ventilation device. Thus, a fine adjustment of the heat evacuation from the powered cavity can be achieved.

For instance, the control unit is connected to a temperature sensor located in thermal communication with the powered cavity, e.t. with the flow path, for a closed loop control of the second ventilation device by the control unit.

The heat evacuation system can be configured so that heat generated in the powered cavity and not destined to the food cavity is evacuated predominantly via the air outlet opening(s) rather than via the food cavity. Such heat may be generated in the powered cavity by at least one of the impeller motor, the control unit, the further motor and, when present, by the thermal conditioner e.g. when the thermal conditioner is inductive and generates heat inductively directly in the container of the food cavity. The heat evacuation system can be for instance configured so that a ratio of the heat evacuated by air outlet opening(s) over the heat evacuated by the food cavity is greater than 2.5, such as greater than 5, for example greater than 10, e.g. greater than 30.

At least one of the first ventilation device and the second ventilation device may have one or more air circulation members that can drive air along the flow path from the inlet opening to the outlet opening.

The air circulation member(s) may have a shape of a wing, blade or vane.

The air circulation member(s) can have a generally arched or curved shape, such as the general shape of an angular section of a cylindrical, conical, spherical, ellipsoidal or helicoidal shape.

The air circulation member(s) may have a generally straight shape formed of a single planar section or a plurality of angled planar sections. For instance, at least one planar section, e.g. all planar sections, have a (non-zero) angle relative to a direction of motion of the circulation member.

The air circulation member(s) can have a plurality of companion air circulation members mounted all together in a loop, e.g. in a circle, such as on a ring or a disc, about a rotation axis. For instance, the air circulation members are generally evenly distributed along the loop.

Typically, the air circulation members are arranged to form a fan driven by the motor.

The air circulation member(s) may have a configuration in which the powered cavity has a generally centrally located axis and peripheral sidewall(s), the one or more air circulation members being driven by the corresponding motor in the powered cavity about the centrally located axis, between the centrally located axis and the sidewall(s), such as at a distance from the centrally located axis in the range of ¼ to ¾ of the spacing from the centrally located axis to the sidewall(s) at the level of the air circulation member(s), e.g. at a distance in the range of ⅓ to ⅔ of such spacing.

For instance, at least one of the impeller motor and the further motor is able to drive an axle, such as a motor's output shaft or an axle driven thereby, one or more of the air circulation member(s) being mounted on such axle. For example, the air circulation member(s) and the corresponding motor rotate at a same rotational speed or at different rotational speeds via a transmission, such as via a gear transmission e.g. a toothed gear transmission.

For instance, a gear arrangement transmits a rotational speed from the motor to the air circulation member(s) at a first transmission ratio and to the impeller at a second transmission ratio different to the first transmission ratio. The first transmission ratio may be greater or smaller than the second transmission ratio. Whether it is greater or smaller and to which extent it is greater or smaller, may be based on the desired rotational speed of the impeller in the container (e.g. depending on the shape of the impeller and the desired result of the liquid food processing) on the one hand and the desired rotational speed of the air circulation member(s) (e.g. depending on the shape, movement path and number of the air circulation member(s) and desired air flow in the powered cavity).

The first ventilation device may be distant to at least one such inlet opening and/or to at least one such air outlet opening.

The second ventilation device can be proximate to at least one such inlet opening and/or to at least one such air outlet opening.

The first ventilation device can be located in the powered cavity at a vertical level of the impeller motor or thereabove.

The second ventilation device may be located in the powered cavity at a vertical level of the further motor or therebelow.

The first and/or second ventilation device may rotate about a generally vertical axis.

The first and/or second ventilation device may rotate about a generally horizontal or inclined axis.

The thermal conditioner, when present, may extend over a portion of an outside wall of the housing or may form such a portion, the portion extending over and being adjacent to an outside wall of the container and/or forming therewith a same wall portion, so as to be able to transmit thermal energy to or through the outside container wall. The transmission of thermal energy from the thermal conditioner may be as such, e.g. a resistive or Pelletier thermal energy transmitted to the outside container wall, or the transmission of thermal energy from the thermal conditioner may be in the form of an electric and/or magnetic (e.g. an inductive) flux that is transmitted to the container for conversion in the container into a thermal energy.

The thermal conditioner can be configured to transmit thermal energy to or through the outside container wall, the thermal conditioner having a first conditioner section extending over a first section of the outside housing wall portion and having a second conditioner section extending over a second section of the outside housing wall portion, the second portion section being distinct from the first portion section. The first conditioner section can be configured to generate a first thermal energy per $cm^2$ that is greater than a second thermal energy per $cm^2$ generated by the second conditioner section. The first conditioner section and second conditioner section may be adjacent to and extend over respective distinct first and second outside container wall sections of the outside container wall and/or may form therewith a same first wall section and a same second wall section distinct from such same first wall section.

Hence, the machine can be fitted with a thermal conditioner that is made of different thermal generating energy sections for generating different amounts of thermal energy along different sections of the container wall. Hence different areas in the food cavity can be exposed to different levels of generated thermal energy to adapt to the different needs at different locations in the food cavity.

For instance, the sections of the thermal conditioner can be generally configured and located such that the outside container wall section which during processing is closer to a greater amount of liquid food substance is exposed to a greater amount of heat generated by the thermal conditioner via the corresponding conditioner section and that the container wall section which is closer to a smaller amount of liquid food substance is exposed to a smaller amount of heat generated by the thermal conditioner via the corresponding section.

The first and second sections of the outside container wall may be so arranged that: the first outside container wall section is located below the second outside container wall section; and/or the first outside container wall section is located closer than the second container wall section to a corner edge formed by a bottom and a sidewall of the food cavity; and/or when the impeller drives the liquid food substance in the food cavity that is partly filled therewith, an average minimal distance of all particles of the liquid food substance relative to the first outside container wall section being smaller than an average minimal distance of all particles of the liquid food substance relative to the second outside container wall section. In the latter arrangement the sections may be configured based on an predetermined expected filling of the food cavity, e.g. milk, with liquid food substance at the beginning of the processing thereof at a given impeller speed.

The thermal conditioner can have a third section extending over a third section of the outside housing wall portion, the third conditioner section being configured to generate a third thermal energy per $cm^2$ that is smaller than the second thermal energy per $cm^2$ and being arranged so that the second conditioner section is located between the first and third conditioner sections. The third conditioner section may be adjacent to and extend over a corresponding distinct third outside container wall section and/or may form therewith a same third wall section distinct from the first and second wall sections. For instance, the thermal conditioner has a fourth section extending over a fourth section of the outside housing wall portion, the fourth conditioner section being configured to generate a fourth thermal energy per $cm^2$ that is smaller than the third thermal energy per $cm^2$ and being arranged so that the third conditioner section is located between the second and fourth sections. The fourth conditioner section may be adjacent to and extend over a corresponding distinct fourth outside container wall section and/ or may form therewith a same fourth wall section distinct from the first, second and third wall sections.

The thermal conditioner can have a third section extending over a third section of the outside housing wall portion, the third conditioner section being configured to generate a third thermal energy per $cm^2$ that is smaller than the first thermal energy per $cm^2$ and being arranged so that the first conditioner section is located between the second and third conditioner sections. The third conditioner section may be adjacent to and extend over a corresponding distinct third outside container wall section and/or may form therewith a same third wall section distinct from the first and second wall sections. For instance, the thermal conditioner has a fourth conditioner section extending over a fourth section of the outside housing wall portion, the fourth conditioner section being configured to generate a fourth thermal energy per $cm^2$ that is smaller than the second or the third thermal energy per $cm^2$ and being arranged so that either the second or the third conditioner section is located between the firth and fourth sections. The fourth conditioner section can be adjacent to and extend over a corresponding distinct fourth outside container wall section and/or can form therewith a same fourth wall section distinct from the first, second and third wall sections.

Of course, providing a machine with three or four sections as described in the above embodiments does not exclude the presence of even more sections of thermal conditioner, outside housing wall portion and outside container wall. For instance, there may be such a large number of different sections as to form a graded continuum or near continuum of sections.

The thermal conditioner may be configured to transmit negative thermal energy, such as a cooling energy for absorbing heat e.g. heat absorbed by a heat pump and/or a Peltier arrangement, or positive thermal energy, such as a heating energy emitting heat e.g. heat generated using a resistive heating circuit and/or an inductive heating circuit, to or through the external container wall, such as a resistive energy.

The thermal conditioner may include an electric conductor that generates, directly (e.g. resistively or by Pelletier effect) or indirectly (e.g. by inductive transfer of electromagnetic energy that is subsequently converted into an inductive current itself generating a resistive thermal energy or Pelletier energy), the thermal energy when conducting an electric current.

The produced thermal energy can be a resistive thermal energy or an inductive thermal energy or a Pelletier thermal energy.

For instance, heat is produced directly in the wall of the container by induction from the electric conductor, e.g. a solenoid conductor, of the thermal conditioner.

The thermal conditioner may include an electrically inert holder that holds the electric conductor.

The thermal conditioner, when generating thermal energy electrically (e.g. resistively, inductively or by Pelletier effect), can comprise a plurality of energy emitting electric sections, such as first and second sections and optionally third section and possibly fourth section, each electric section comprising at least one electric conductor connected, directly or indirectly, to a power source via corresponding connectors. At least two such sections may differ from one another:
dimensionally and/or materially to generate and transmit different quantities of energies when conducting the same electric current; and/or
by different power sources, each electric section having a dedicated power source that can deliver an electric power that is different to a power delivered by another power source of a different electric section.

For instance, the thermal conditioner has an electric wire, e.g. a copper wire or an aluminum wire, of a generally constant section and material as such electric conductor(s), each electric section having a wire portion of a given length in which the length of one section is different to the length of another section, the sections being in a serial or a parallel electric arrangement and connected, directly or indirectly, via connectors to one or more power sources.

The housing and the container may be configured such that the housing forms a seat, e.g. a nest, for receiving the container that has an upright extending part, the portion of the outside housing wall extending over at least part of the upright extending container part. At least part of thermal conditioner may be located inside the housing along the upright extending container part.

The housing and the container can be configured so that the container is made of one or more electrically passive components, e.g. a passive resistor or Pelletier element and/or a passive energy permeable material, whereas the housing comprises all active components.

Motors, control units, user-interfaces, AC/DC converters can all be comprised in the housing, e.g. in the powered cavity.

The container may be mechanically passive. Hence, beyond the inherent mechanical properties of the materials making its structure for containing the food substance and for being integrated or assembled in the machine, the container may be free of any mechanically active part such as a motor or movement transformation system which may require special care for hygiene or cleaning purposes.

By providing a container which is mechanically and/or electrically passive (optionally with a lid that is equally passive), it can easily be cleaned, e.g. in a dishwater, without any risk of damaging electric and/or mechanic components.

When reference is made in the present description to an orientation or position relative to the machine or parts thereof, e.g. "above" or "below" or "vertical" or "horizontal", the orientation or position takes as a reference the position and orientation of the machine in operation to process the liquid food substance in the food cavity unless specified otherwise.

"Thermal energy" may refer to calories or to electric energy that is to be converted into calories.

BRIEF DESCRIPTION OF THE DRAWINGS

The invention will now be described with reference to the schematic drawings, wherein.

DETAILED DESCRIPTION

Figure 1:
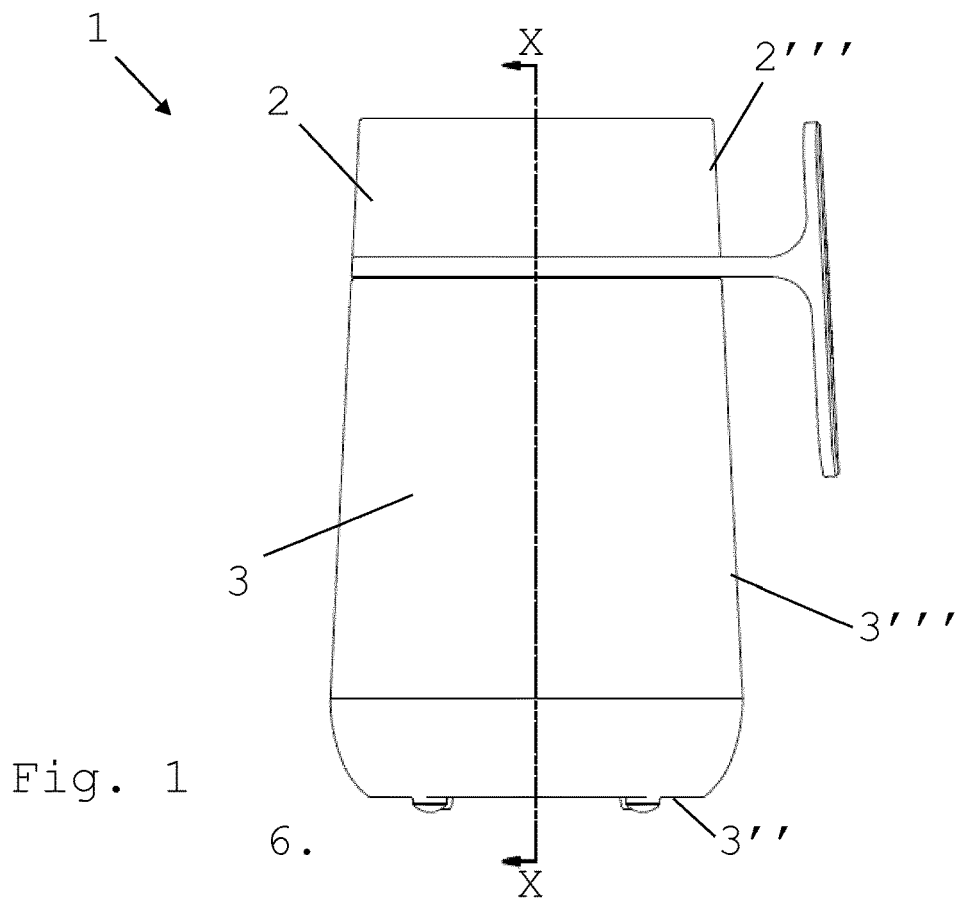
FIG. 1 is a perspective view of a machine according to the invention.

A particular embodiment of a machine 1 according to the invention is illustrated in FIGS. 1 to 4.

Machine 1 is configured for processing a liquid food substance 10 such as milk or a milk-based substance.

Machine 1 includes a container 2 delimiting a food cavity 2' for containing liquid food substance 10, such as a container provided with a removable lid for covering cavity 2'.

Machine 1 has an impeller 20 for driving liquid food substance 10 in food cavity 2'.

Machine 1 comprises a housing 3 delimiting an electrically powered cavity 3', e.g. a cavity 3' powered by the mains via an electric cord 5, that is adjacent to container 2 and that contains: a motor 30 for driving impeller 20; and a heat evacuation system 35,36,37,37',37" for evacuating heat from powered cavity 3' to a space 6 outside machine 1. The heat evacuation system includes a motorized ventilation arrangement 35,36 and at least one flow path 37 extending in powered cavity 3' from at least one air inlet opening 37' in housing 3 to at least one air outlet opening 37" in housing 3. For instance, openings 37',37" are located on a machine external bottom face 3" and/or machine external side face(s) 3'''.

Cavity 3' may include a thermal conditioner 40 for generating heat in food cavity 2' and/or for removing heat from food cavity 2'.

Machine 1 includes a control unit 31, e.g. a unit 31 in powered cavity 3' and/or fixed to housing 3, for controlling impeller motor 30, ventilation arrangement 35,36 and, when present, thermal conditioner 40.

Motorized ventilation arrangement 35,36 has a first ventilation device 35 driven by impeller motor 30.

Impeller 20 can have at least one of: a surface for imparting a mechanical effect to liquid food substance 10 in container cavity 2', such as for mixing liquid food substance 10 with another fluid, e.g. air; a foot for being coupled to impeller motor 30, e.g. via magnetic elements in the foot; an axle extending towards a mouth of container 2 when impeller 20 is driven by impeller motor 30, e.g. an axle that is seizable by a user for removing impeller 20 from container 2.

Further to first ventilation device 35 and to impeller motor 30, the motorized ventilation arrangement comprises a second ventilation device 36 and a further motor 38 that is different to impeller motor 30. Such further motor 38 is controlled by control unit 31 to drive second ventilation device 36.

For instance, control unit 31 is connected to a temperature sensor 31' located in thermal communication with powered cavity 3', e.g. with flow path 37, for a closed loop control of second ventilation device 36 by control unit 31.

Container 2 may be removable from housing 3 for dispensing liquid food substance 10 from cavity 2' and assemblable to housing 3 for processing liquid food substance 10 in cavity 2'.

For instance housing 3 forms a seat, e.g. generally a nest, for removably receiving container 2.

Housing 3 may have an outer peripheral upright face 3''' that extends flush with an outer peripheral upright face 2''' of container 2.

Heat evacuation system 35,36,37,37',37" can be configured so that heat generated in powered cavity 3' and not destined to food cavity 2' is evacuated predominantly via the air outlet opening(s) 37" rather than via food cavity 2', such as heat generated in powered cavity 3' by at least one of the impeller motor 30, control unit 31, further motor 38 and, when present, by thermal conditioner 40. For instance, heat evacuation system is configured so that a ratio of the heat evacuated by air outlet opening(s) 37" over heat evacuated by food cavity 2' is greater than 2.5, such as greater than 5, for example greater than 10, e.g. greater than 30.

At least one of first ventilation device 35 and second ventilation device 36 may have one or more air circulation members that can drive air along flow path 37 from inlet opening 37' to outlet opening 37".

The air circulation member(s) may have a shape of a wing, blade or vane.

The air circulation member(s) can have a generally arched or curved shape, such as the general shape of an angular section of a cylindrical, conical, spherical, elliptoidal or helicoidal shape.

The air circulation member(s) may have a generally straight shape formed of a single planar section or a plurality of angled planar sections, optionally at least one planar section, e.g. all planar sections, having a (non-zero) angle relative to a direction of motion of the circulation member.

The air circulation member(s) can have a plurality of companion air circulation members mounted all together in a loop, e.g. in a circle, such as on a ring or a disc, about a rotation axis. For instance, the air circulation members are generally evenly distributed along the loop.

The air circulation member(s) may have a configuration in which powered cavity 3' has a generally centrally located axis 30' and peripheral sidewall(s) 3'''. The one or more air circulation members can be driven by corresponding motor 30,38 in powered cavity 3' about centrally located axis 30', between centrally located axis 30' and sidewall(s) 3''', such as at a distance from the centrally located axis 30' in the range of ¼ to ¾ of the spacing from centrally located axis 30' to sidewall(s) 3''' at the level of the air circulation member, e.g. at a distance in the range of ⅓ to ⅔ of such spacing.

At least one of impeller motor 30 and further motor 38 may drive an axle, such as a motor's output shaft or an axle driven thereby, one or more of the air circulation member(s) being mounted on the axle. For instance, the air circulation member(s) and corresponding motor 30,38 are configured to rotate at a same rotational speed or at different rotational speeds via a transmission, such as via a gear transmission e.g. a toothed gear transmission.

First ventilation device 35 may be distant to at least one inlet opening 37' and/or to at least one air outlet opening 37". Second ventilation device 36 may be proximate to at least one air inlet opening 37' and/or to at least one air outlet opening 37".

First ventilation device 35 can be located in powered cavity 3' at a vertical level of impeller motor or thereabove. Second ventilation device 36 may be located in powered cavity 3' at a vertical level of the further motor 38 or therebelow.

First and/or second ventilation device 35,36 may rotate about a generally vertical axis 30'.

The first and/or second ventilation device may rotate about a generally horizontal or inclined axis.

Thermal conditioner 40, when present, may extend over a portion 3"" of an outside wall of housing 3 or may form such a portion 3"". Portion 3"" can extend over and be adjacent to an outside wall 2" of container 2 and/or can form therewith a same wall portion, so as to be able to transmit thermal energy to or through the outside container wall 2".

Thermal conditioner 40 may be configured to transmit thermal energy to or through the outside container wall 2", thermal conditioner 40 having a first section 41 extending over a first section of outside housing wall portion 3"" and having a second section 42 extending over a second section of outside housing wall portion 3"" that is distinct from the first section. First conditioner section 41 may be configured to generate a first thermal energy per $cm^2$ that is greater than a second thermal energy per $cm^2$ generated by second conditioner section 42, the first conditioner section and second conditioner section being adjacent to and extending over respective distinct first and second outside container wall sections 21,22 of outside container wall 2" and/or forming therewith a same first wall section and a same second wall section distinct from said same first wall section.

First and second sections 21,22 of outside container wall 2" can be so arranged that: first outside container wall section 21 is located below second outside container wall section 22; and/or first outside container wall section 21 may be located closer than second container wall section 22 to a corner edge 23 formed by a bottom and a sidewall of food cavity 2'.

When impeller 20 drives liquid food substance 10 in food cavity 2' that is partly filled therewith, an average minimal distance of all particles of liquid food substance 10 relative to first outside container wall section 21 can be smaller than an average minimal distance of all particles of liquid food substance 10 relative to second outside container wall section 22.

Figure 2:
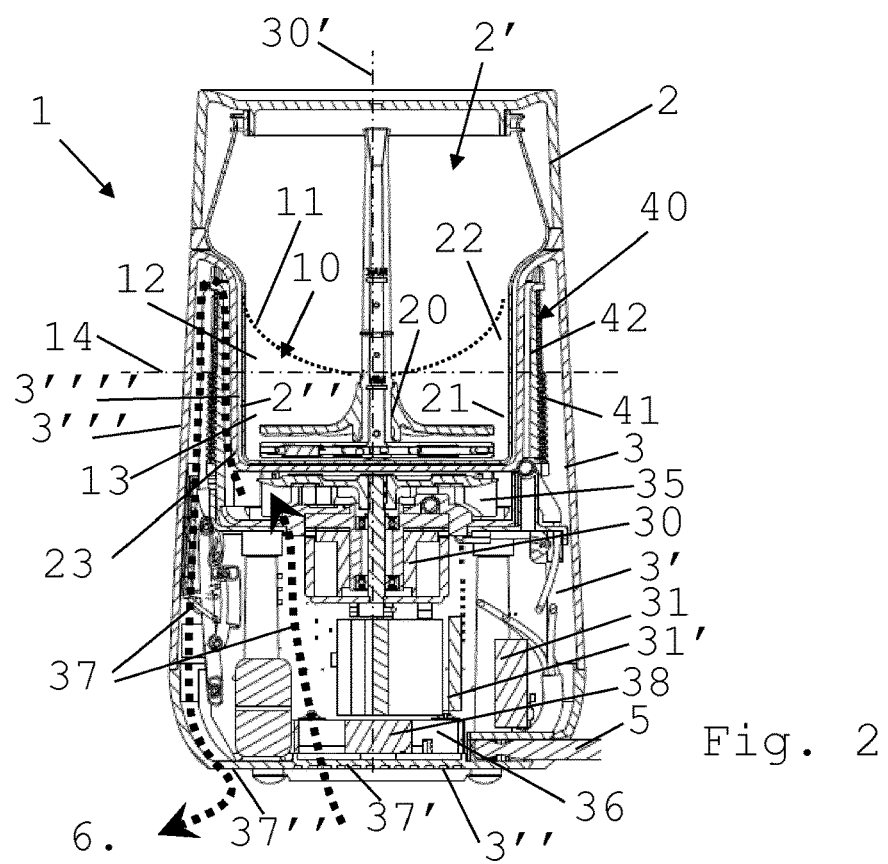
FIG. 2 is a cross-sectional view of the machine of FIG. 1 showing a container with a food cavity assembled to a housing with a powered cavity.
Figure 3:
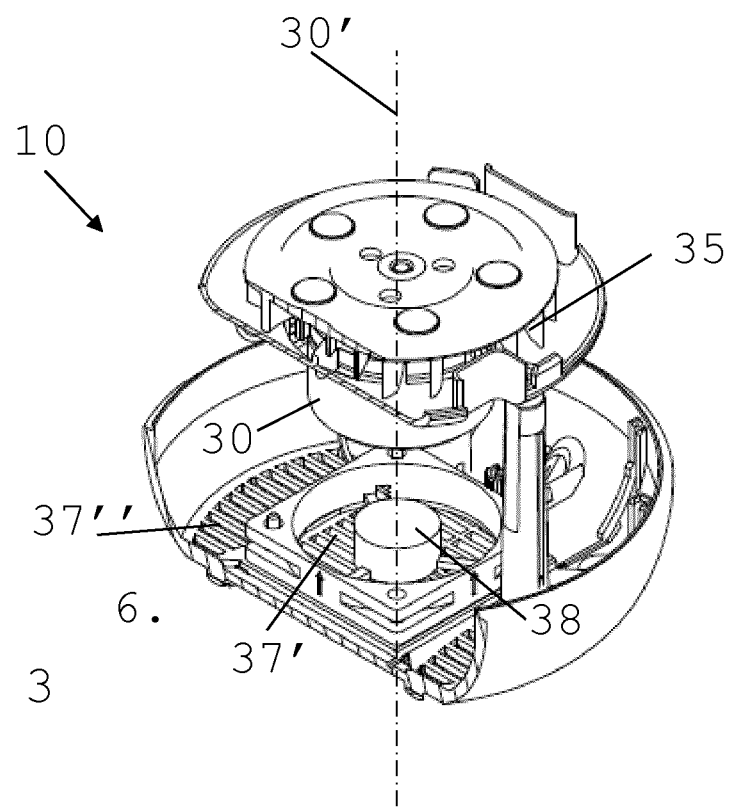
FIG. 3 shows a perspective view of a motorized ventilation arrangement to be mounted in the powered cavity of FIG. 2.
Figure 4:
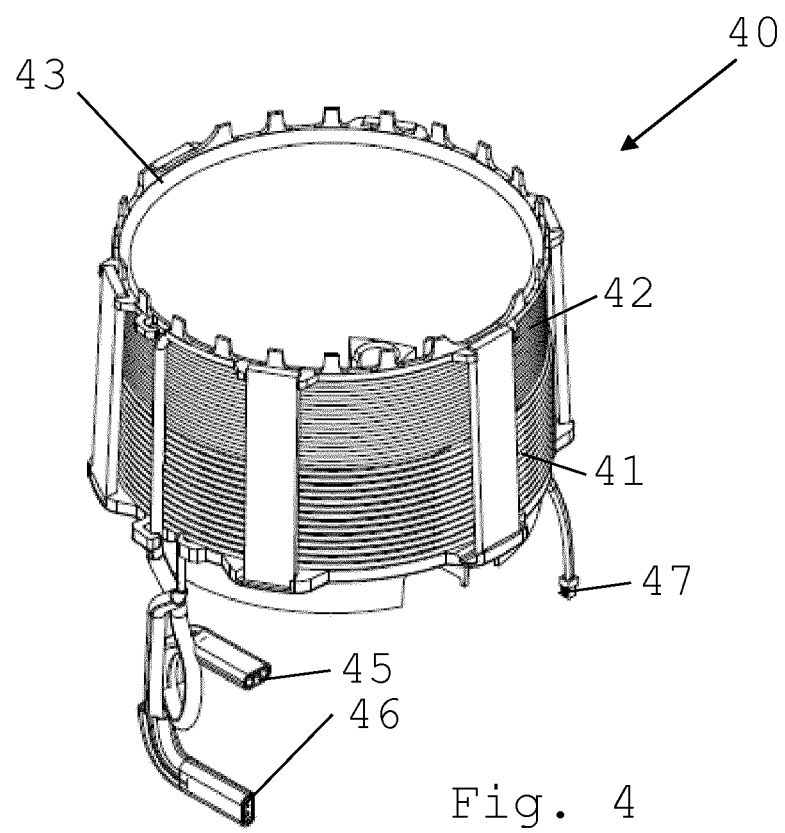
FIG. 4 shows a perspective view of a thermal conditioner illustrated in FIG. 2.

For example, as illustrated in FIG. 2, when impeller rotates to drive liquid food substance 10 in food cavity 2', a kind of vortex may formed with a surface 11 of substance 10 that raises towards container wall 2" from a bottom at a level 14 in cavity 2'. Hence, above level 14 there is less liquid food substance 10 than below level 14 to absorb or release thermal energy from or to the container's wall and thus thermal conditioner can be adjusted to take into account the different thermal requirements of liquid food substance 10 depending on the distribution of substance 10 in cavity 3'. In the illustrated example, first section 41 can be configured to generate more (positive or negative) thermal energy than second section 42.

Figure 5:
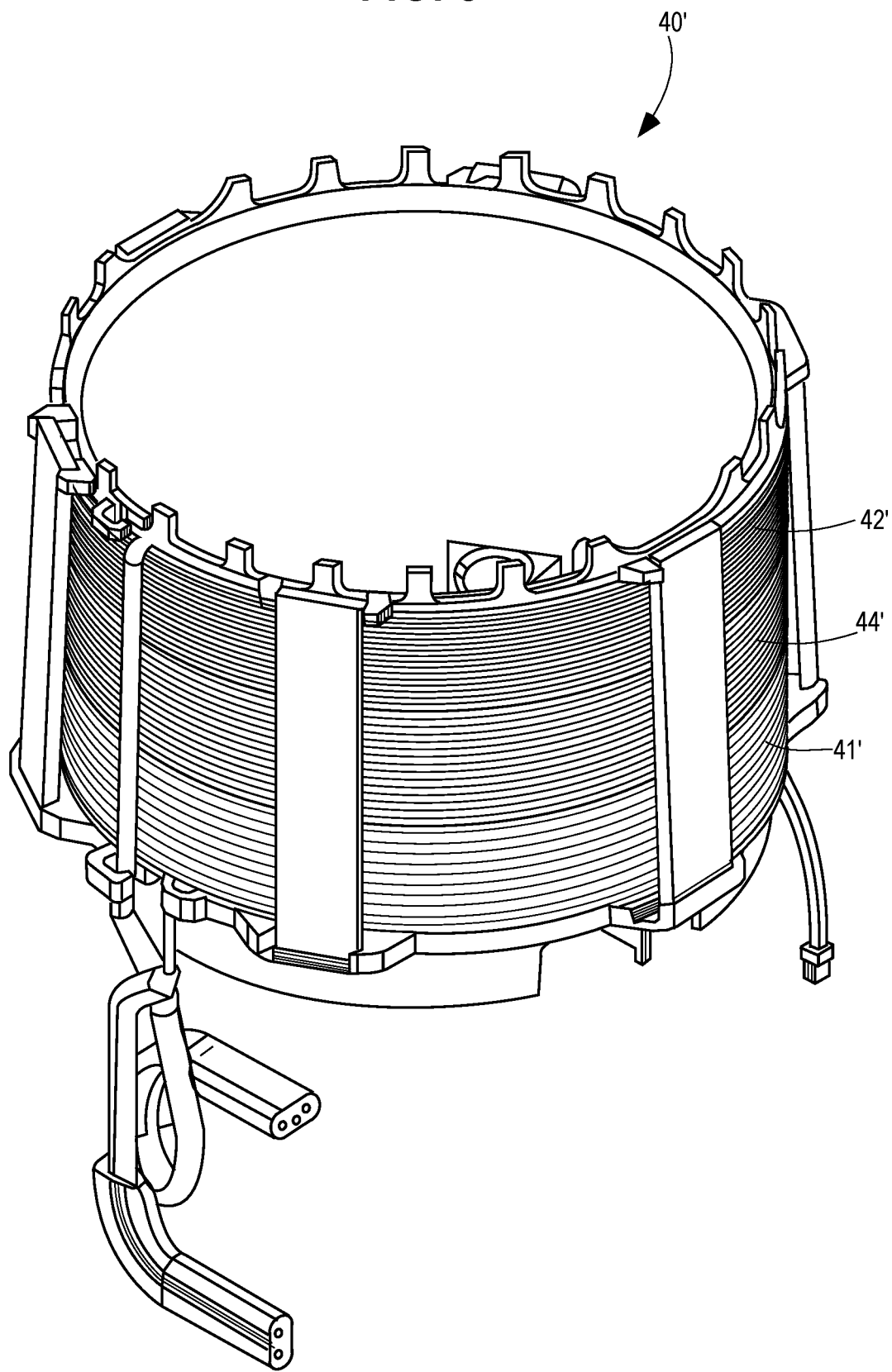
FIG. 5 shows a perspective view of an alternative embodiment of the thermal conditioner illustrated in FIG. 4.

In a further embodiment illustrated in FIG. 5, the thermal conditioner 40' may have a third section 44' extending over a third section of the outside housing wall portion, the third conditioner section 44' being configured to generate a third thermal energy per cm2 that is smaller than the second thermal energy per cm2 and being arranged so that the second conditioner section 42' is located between the first and third conditioner sections 41', 44'. The third conditioner section 44' may be adjacent to and may extend over a corresponding distinct third outside container wall section and/or may form therewith a same third wall section distinct from the first and second wall sections. For instance, the thermal conditioner has a fourth section extending over a fourth section of the outside housing wall portion, the fourth conditioner section being configured to generate a fourth thermal energy per cm2 that is smaller than the third thermal energy per cm2 and being arranged so that the third conditioner section is located between the second and fourth conditioner sections. The fourth conditioner section may be adjacent to and extend over a corresponding distinct fourth outside container wall section and/or may form therewith a same fourth wall section distinct from the first, second and third wall sections.

Figure 6:
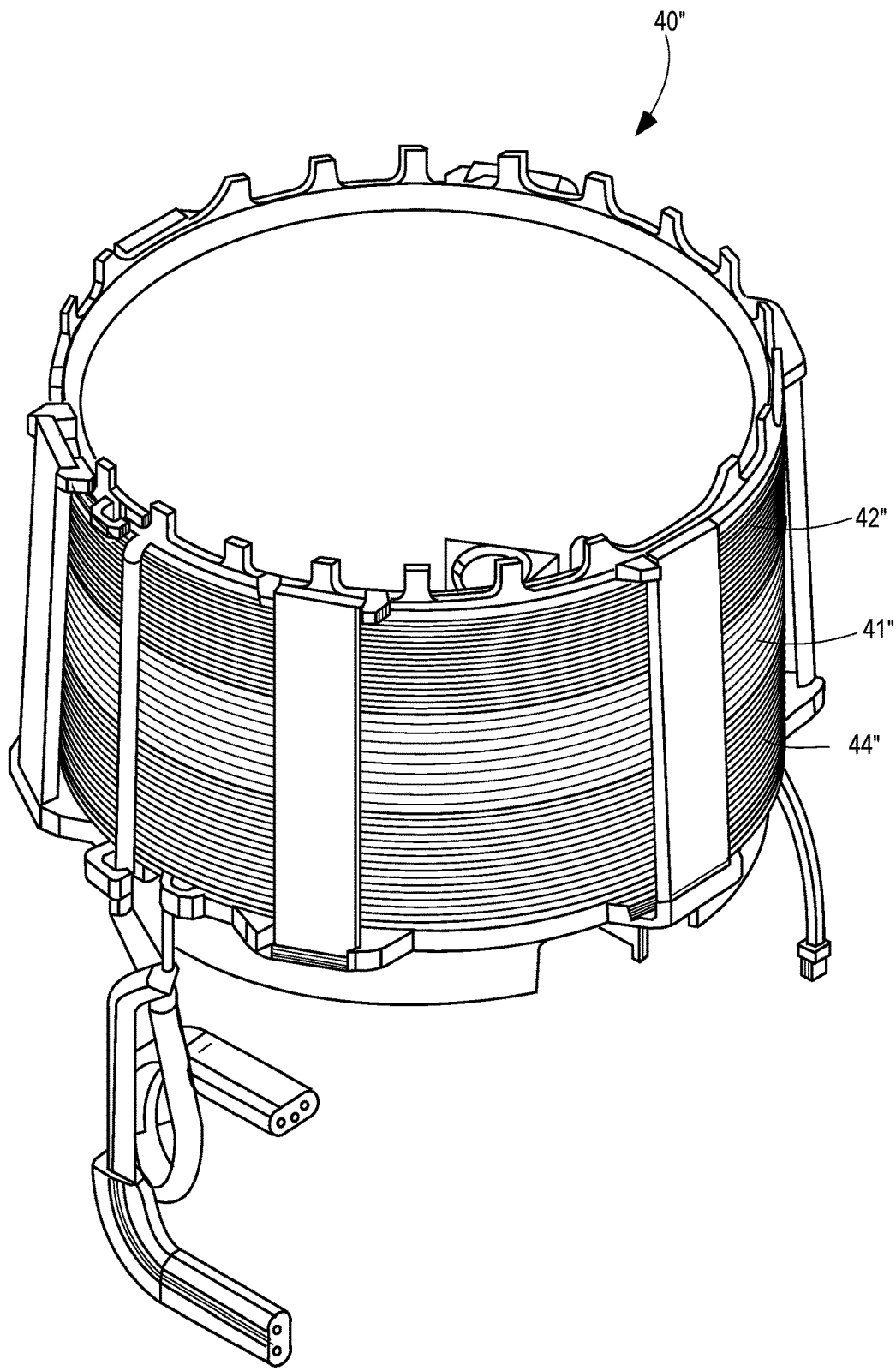
FIG. 6 shows a perspective view of a further alternative embodiment of the thermal conditioner illustrated in FIG. 4.

In a further embodiment illustrated in FIG. 6, the thermal conditioner 40" can have a third section 44" extending over a third section of the outside housing wall portion, the third conditioner section 44" being configured to generate a third thermal energy per $cm^2$ that is smaller than the first thermal energy per $cm^2$ and being arranged so that the first conditioner section 41" is located between the second and third conditioner sections 42", 44". The third conditioner section can be adjacent to and extend over a corresponding distinct third outside container wall section and/or can form therewith a same third wall section distinct from the first and second wall sections. For instance, the thermal conditioner has a fourth section extending over a fourth section of the outside housing wall portion, the fourth conditioner section being configured to generate a fourth thermal energy per $cm^2$ that is smaller than the second or the third thermal energy per $cm^2$ and being arranged so that either the second or the third conditioner section is located between the firth and fourth conditioner sections. The fourth conditioner section may be adjacent to and extend over a corresponding distinct fourth outside container wall section and/or may form therewith a same fourth wall section distinct from the first, second and third wall sections.

Thermal conditioner 40 may be configured to transmit negative thermal energy, such as a cooling energy absorbing heat e.g. heat absorbed by a heat pump and/or a Peltier arrangement, or positive thermal energy, such as a heating energy emitting heat e.g. heat generated using a resistive heating circuit and/or an inductive heating circuit, to or through the external container wall 2", such as a resistive energy.

Thermal conditioner 40 can include an electric conductor 41,42,45,46,47 that emits the thermal energy when conducting an electric current.

The produced thermal energy can be a resistive thermal energy or an inductive thermal energy or a Pelletier thermal energy.

Thermal conditioner 40 may include an electrically inert holder 43 that holds the electric conductor.

Thermal conditioner 40 can comprise a plurality of electric sections 41,42, such as first and second sections 41,42 and optionally third section and possibly fourth section. Each electric section may include at least one electric conductor connected, directly or indirectly, to a power source via corresponding connectors 45,47;46,47, at least two sections 41,42 differing from one another: dimensionally and/or materially to generate and transmit different quantities of energies when conducting the same electric current; and/or by different power sources 45,46, each electric section 41,42 having a dedicated power source that can deliver an electric power that is different to a power delivered by another power source of a different electric section 42,41.

Thermal conditioner 40 may have an electric wire, e.g. a copper wire or an aluminum wire, of a generally constant section and material as said electric conductor(s). Each electric section 41,42 can have a wire portion of a given length in which the length of one section 41 is different to the length of another section 42. The sections may be in a serial or a parallel electric arrangement and connected, directly or indirectly, via connectors 45,47;46,47 to one or more power sources.

Housing 3 and container 2 may be configured such that housing 3 forms a seat, e.g. a nest, for receiving container 2 that has an upright extending part, portion 3''' of the outside housing wall extending over at least part of the upright extending container part, whereby at least part thermal conditioner 40 is located inside housing 3 along the upright extending container part.

Container 2 may be made of one or more passive components, e.g. a passive resistor and/or a passive heat permeable material, whereas housing 3 comprises all active electric components.

The invention claimed is:

1. A machine for processing a liquid food substance, the machine comprising:
   a container delimiting a food cavity configured for containing the liquid food substance;
   an impeller configured for driving the liquid food substance in the food cavity;
   a housing delimiting a powered cavity adjacent the container, the housing containing:
      a motor configured for driving the impeller;
      a thermal conditioner configured for generating heat in the food cavity and/or for removing heat from the food cavity; and
      a heat evacuation system configured to evacuate heat from the powered cavity to a space outside the machine, the heat evacuation system comprising a motorized ventilation arrangement and at least one flow path extending in the powered cavity from at least one air inlet opening in the housing to at least one air outlet opening in the housing via the thermal conditioner;
   a control unit configured to control the motor and the motorized ventilation arrangement,
   the motorized ventilation arrangement comprising a first ventilation device driven by the motor,
   further to the first ventilation device and to the motor, the motorized ventilation arrangement comprises a second ventilation device and a further motor that is different than the motor, the further motor being controlled by the control unit to drive the second ventilation device, the first ventilation device and the second ventilation device configured to drive air along the at least one flow path;
   wherein the heat evacuation system is configured to evacuate heat generated in the powered cavity predominantly via the at least one air outlet opening.

2. The machine of claim 1, wherein the container is removable from the housing for dispensing the liquid food substance from the food cavity and assemblable to the housing for processing the liquid food substance in the food cavity.

3. The machine of claim 1, wherein at least one of the first ventilation device and the second ventilation device has one or more air circulation members configured to drive air along the at least one flow path from the at least one inlet opening to the at least one outlet opening.

4. The machine of claim 1, wherein:
   the first ventilation device is distant to the at least one air inlet opening and/or to the at least one air outlet opening; and
   the second ventilation device is proximate to the at least one air inlet opening and/or to the at least one air outlet opening.

5. The machine of claim 1, wherein:
   the first ventilation device is located in the powered cavity at a vertical level of the motor or thereabove;
   the second ventilation device is located in the powered cavity at a vertical level of the further motor or therebelow; and/or
   the first and/or second ventilation device rotates about an axis that is vertical, horizontal, or inclined.

6. The machine of claim 1, wherein the powered cavity has a centrally located axis, and
   wherein the thermal conditioner extends over and forms a portion of an outside wall of the housing that is substantially parallel to the centrally located axis of the powered cavity, and is configured to transmit thermal energy to or through an outside container wall.

7. The machine of claim 6, wherein the thermal conditioner is configured to transmit the thermal energy to or through the outside container wall, the thermal conditioner having a first section extending over a first section of the outside wall of the housing and having a second section extending over a second section of the outside wall of the housing that is distinct from the first section, the first section and the second section being positioned at substantially the same radial distance from the centrally located axis of the powered cavity, the first section of the thermal conditioner being configured to generate a first thermal energy per $cm^2$ that is greater than a second thermal energy per $cm^2$ generated by the second section, the first section and the second section being adjacent to and extending over and/or forming a first section and a second section, respectively, of the outside container wall.

8. The machine of claim 7, wherein the first section and the second section of the outside container wall are arranged such that:
the first section of the outside container wall is located below the second section of the outside container wall;
the first section of the outside container wall is located closer than the second section of the outside container wall to a corner edge formed by a bottom and a sidewall of the food cavity; and
when the impeller drives the liquid food substance in the food cavity, an average minimal distance of all particles of the liquid food substance relative to the first section of the outside container wall is smaller than an average minimal distance of all particles of the liquid food substance relative to the second section of the outside container wall.

9. The machine of claim 7, wherein the thermal conditioner has a third section extending over a third section of the outside wall of the housing, the third section of the thermal conditioner being configured to generate a third thermal energy per $cm^2$ that is smaller than the second thermal energy per $cm^2$ and being arranged so that the second section is located between the first section and the third section of the thermal conditioner, the third section of the thermal conditioner being adjacent to and extending over and/or forming a corresponding distinct third section of the outside container wall, the third section of the outside container wall being distinct from the first section and the second section.

10. The machine of claim 7, wherein the thermal conditioner has a third section extending over a third section of the outside wall of the housing, the third section of the thermal conditioner being configured to generate a third thermal energy per $cm^2$ that is smaller than the first thermal energy per $cm^2$ and being arranged so that the first section of the thermal conditioner is located between the second and third sections, the third section of the thermal conditioner being adjacent to and extending over and/or forming a corresponding distinct third section of the outside container wall, the third section of the container wall being distinct from the first section and the second section.

11. The machine of claim 6, wherein the thermal conditioner is configured to transmit negative thermal energy or positive thermal energy.

12. The machine of claim 6, wherein the thermal conditioner comprises an electric conductor configured to emit the thermal energy when conducting an electric current.

13. The machine of claim 12, wherein the thermal conditioner comprises a plurality of electric sections, each electric section comprising at least one electric conductor connected to a power source via corresponding connectors, at least two electric sections differing from one another:
dimensionally and/or materially to generate and transmit different quantities of energies when conducting the same electric current; and/or
by different power sources, each electric section having a dedicated power source configured to deliver an electric power that is different than an electric power delivered by another power source of a different electric section.

14. The machine of claim 6, wherein the housing and the container are configured such that:
the housing forms a seat for receiving the container, the portion of the outside wall of the housing extending over at least part of an upright extending container part, whereby at least a majority of the thermal conditioner is located inside the housing along the upright extending container part; and
the container comprises one or more passive electric components.

15. The machine of claim 1, wherein the powered cavity is powered by a mains via an electric cord.

16. The machine of claim 1, wherein the control unit is connected to a temperature sensor located in thermal communication with the at least one flow path for a closed loop control of the second ventilation device by the control unit.

17. The machine of claim 2, wherein the housing forms a seat for removably receiving the container, the housing having an outer peripheral upright face that extends flush with an outer peripheral upright face of the container.

18. The machine of claim 1, wherein the heat generated in the powered cavity is generated by at least one of the motor, the control unit, the further motor, and the thermal conditioner, and wherein the at least one flow path extending in the powered cavity begins at the at least one air inlet opening in the housing, passes at least one of over, across or through the thermal conditioner, and ends at the at least one air outlet opening in the housing.

19. The machine of claim 1, wherein a ratio of the heat evacuated by the at least one air outlet opening over heat evacuated by the food cavity is greater than 2.5.

20. The machine of claim 11, wherein the thermal conditioner is configured to transmit the negative thermal energy, and wherein the negative thermal energy comprises a cooling energy.

21. The machine of claim 20, wherein the cooling energy comprises heat absorbed by a heat pump and/or a Peltier arrangement.

22. The machine of claim 11, wherein the positive thermal energy comprises a heating energy.

23. The machine of claim 22, wherein the heating energy comprises heat generated by a resistive heating circuit and/or an inductive heating circuit to or through an outside container wall.

24. The machine of claim 23, wherein the heat is generated by the inductive heating circuit, and wherein the heating energy comprises a resistive energy.

* * * * *